US012624822B2

(12) United States Patent
McAllister

(10) Patent No.: US 12,624,822 B2
(45) Date of Patent: May 12, 2026

(54) ILLUMINATION DEVICES FOR SITES AND CHAIRS

(71) Applicant: Brightz, Ltd., Ottawa Lake, MI (US)

(72) Inventor: James McAllister, Perrysburg, OH (US)

(73) Assignee: Brightz, Ltd., Ottawa Lake, MI (US)

( * ) Notice: Subject to any disclaimer, the term of this patent is extended or adjusted under 35 U.S.C. 154(b) by 0 days.

(21) Appl. No.: 19/061,203

(22) Filed: Feb. 24, 2025

(65) Prior Publication Data

US 2025/0189107 A1 Jun. 12, 2025

Related U.S. Application Data

(63) Continuation of application No. 18/630,333, filed on Apr. 9, 2024, now Pat. No. 12,247,724, which is a continuation of application No. 18/134,715, filed on Apr. 14, 2023, now Pat. No. 11,976,807.

(60) Provisional application No. 63/331,439, filed on Apr. 15, 2022.

(51) Int. Cl.

*F21V 21/088* (2006.01)
*F21S 9/02* (2006.01)
*F21V 21/096* (2006.01)

(52) U.S. Cl.

CPC .............. *F21V 21/088* (2013.01); *F21S 9/02* (2013.01); *F21V 21/0885* (2013.01); *F21V 21/096* (2013.01); *F21V 21/0965* (2013.01)

(58) Field of Classification Search

CPC .. F21V 21/088; F21V 21/0885; F21V 21/096; F21V 21/0965; F21S 9/02
USPC ......................... 362/157, 398, 183, 184, 191
See application file for complete search history.

(56) References Cited

U.S. PATENT DOCUMENTS

| | | | | |
|---|---|---|---|---|
| 7,726,852 | B2 | 6/2010 | Sanoner | |
| 8,317,355 | B1 * | 11/2012 | Wang | F21V 33/006 362/396 |
| 11,976,807 | B2 | 5/2024 | McAllister | |
| 12,247,724 | B2 * | 3/2025 | McAllister | F21V 21/0885 |
| 2003/0231489 | A1 | 12/2003 | Hsiao | |
| 2014/0177211 | A1 | 6/2014 | Zhu | |
| 2014/0285355 | A1 | 9/2014 | Matte | |
| 2016/0197502 | A1 | 7/2016 | Waters | |
| 2018/0058671 | A1 * | 3/2018 | Cramer | F21L 4/027 |
| 2024/0263764 | A1 * | 8/2024 | Mancillas | F21V 23/04 |

* cited by examiner

*Primary Examiner* — Laura K Tso

(74) *Attorney, Agent, or Firm* — Vorys, Sater, Seymour and Pease LLP; Rex W. Miller, II

(57) ABSTRACT

An illumination device includes an illumination portion including one or more illumination sources, and a coupling portion flexibly connected to the illumination portion, in which the illumination portion and the coupling portion are capable of coupling together through magnetic force provided by at least one magnet positioned within the illumination portion or the coupling portion.

20 Claims, 7 Drawing Sheets

ILLUMINATION DEVICES FOR SITES AND CHAIRS

CROSS-REFERENCE TO RELATED APPLICATION

This application is a continuation of U.S. application Ser. No. 18/630,333 filed Apr. 9, 2024, which is a continuation of U.S. application Ser. No. 18/134,715 filed Apr. 14, 2023, which claims the benefit of U.S. Provisional Application No. 63/331,439 filed Apr. 15, 2022, each of which are incorporated by reference in their entirety herein.

TECHNICAL FIELD

The present specification relates to illumination devices, and more specifically to selectively attachable illumination devices capable of being attached to a variety of objects such as canvas chairs, camping tents, tarps, canopies, or the like.

BACKGROUND

Flashlights and similar illumination devices are commonly used for outdoor activities such as camping or the like to illuminate the outdoor environment.

SUMMARY

In one embodiment, an illumination device having an elongated flexible body having a first end connected to a second end via a flexible connecting body; and an illumination portion coupled to the first end and a coupling portion coupled to the second end, wherein the illumination portion includes one or more illuminating sources and a first magnetic component housed within the illumination portion, the coupling portion includes a second magnetic component housed within the coupling portion, and the flexible connecting body is capable of folding such that the illumination portion and the coupling portion axially align and the first magnetic component magnetically couples to the second magnetic component.

In another embodiment, an illumination device having an illumination portion and a coupling portion, wherein the illumination portion includes one or more illuminating sources and a first magnetic component housed within the illumination portion, the coupling portion includes a second magnetic component housed within the coupling portion, and the illumination portion and the coupling portion are capable of attached to each other through a material when axially align such that the first magnetic component magnetically couples to the second magnetic component.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals.

DETAILED DESCRIPTION

References will now be made in detail to the embodiments of the disclosure, examples of which are illustrated in the accompanying drawings. Whenever possible, like reference numbers will be used to refer to like components or parts.

Embodiments described herein are directed to illumination devices. The illumination devices have unique designs, various illumination modes, and are capable of being attached to a variety of objects such as canvas chairs, camping tents, tarps, canopies, or the like. More specifically, embodiments of the present illumination device are configured to fold over an edge of a material and through the magnetic forces provided by magnets in each end of the illumination device couple to the material. Accordingly, the illumination device may be selectively coupled to and uncoupled from the material of an object without deforming the object or requiring an intrusive fastener.

As described in more detail herein, the illumination device may be coupled to a camping tent or a chair such as a canvas folding chair to provide illuminating light thereabout. Moreover, the illumination device may be weather resistant. The following will now describe embodiments of illumination devices in detail with reference to the figures.

Figure 1:
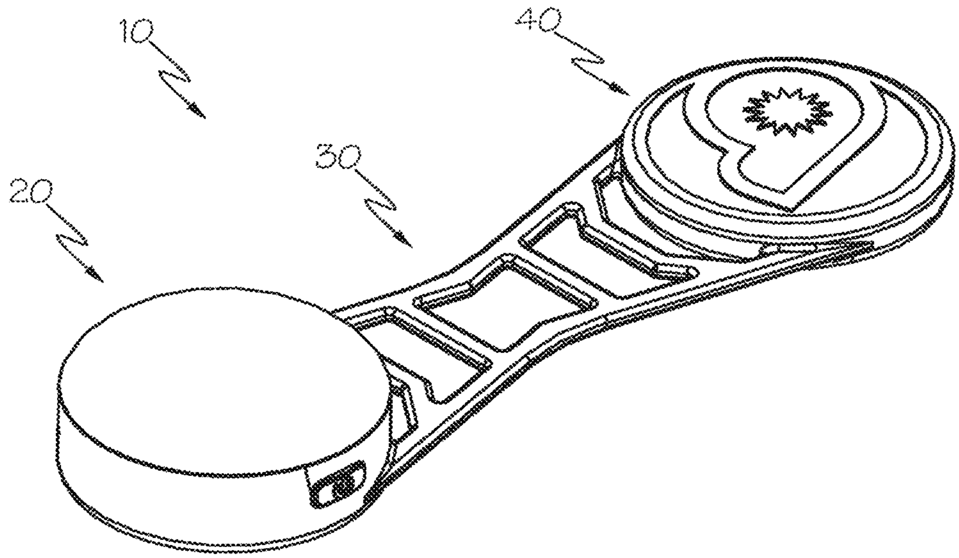
FIG. 1 depicts an illustrative embodiment of an illumination device, according to one or more embodiments shown and described herein.

FIG. 1 depicts an illustrative embodiment of an illumination device 10. The illumination device 10 includes a few main portions. A first portion 20, also referred to herein as the illumination portion, a body 30, and a second portion 40, also referred to herein as the coupling portion. It should be understood that some embodiments may not include a body 30. The first portion 20 includes an illumination source and structural elements for housing the illumination source and one or more magnets. The second portion 40 includes a rigid internal structure and one or more coupling elements such as magnets. The second portion 40 also include decorative features such as a logo. The body 30 is an elongated flexible material that couples the first portion 20 and the second portion 40 together. The body 30 may be made of a silicone or other flexible material. The body 30 receives the first portion 20 at one end and the second portion 40 at the other end. The structure of the illumination device will be described in more detail herein.

Figure 2:
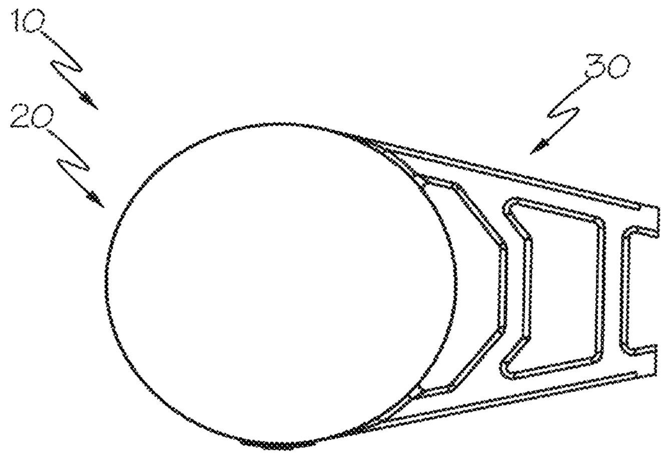
FIG. 2 depicts an illustrative embodiment of an illuminating portion of the illumination device, according to one or more embodiments shown and described herein.
Figure 3:
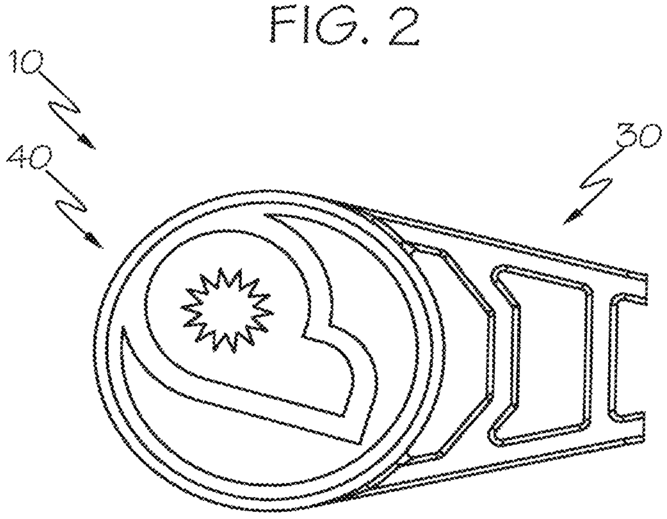
FIG. 3 depicts an illustrative embodiment of a coupling portion of the illumination device, according to one or more embodiments shown and described herein.
Figure 4:
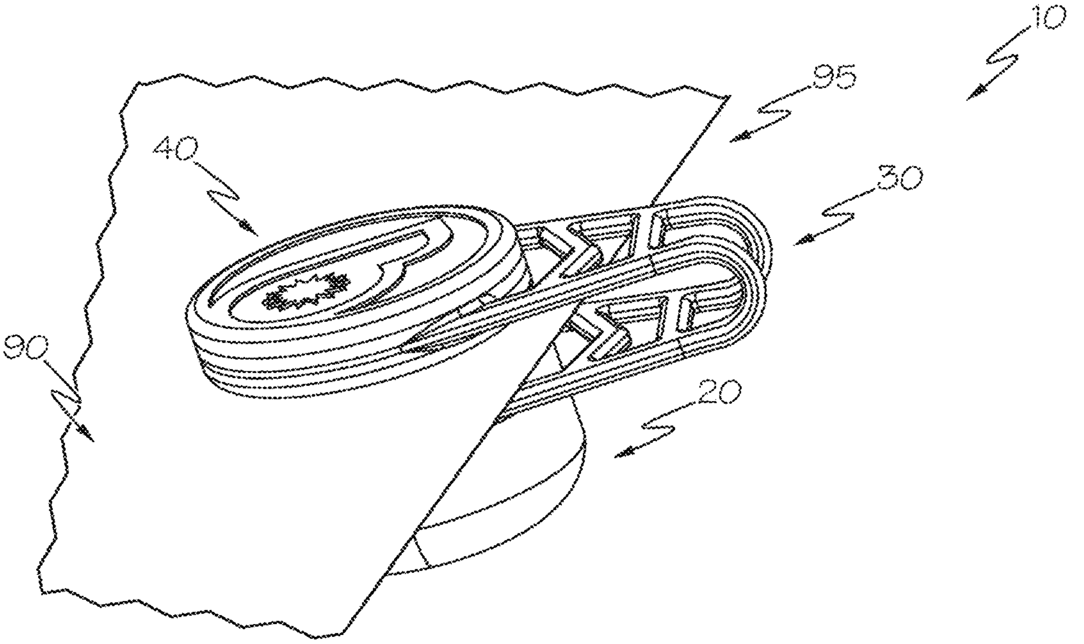
FIG. 4 depicts an illustrative embodiment of the illumination device coupled to an edge of a tent or tarp, according to one or more embodiments shown and described herein.
Figure 5:
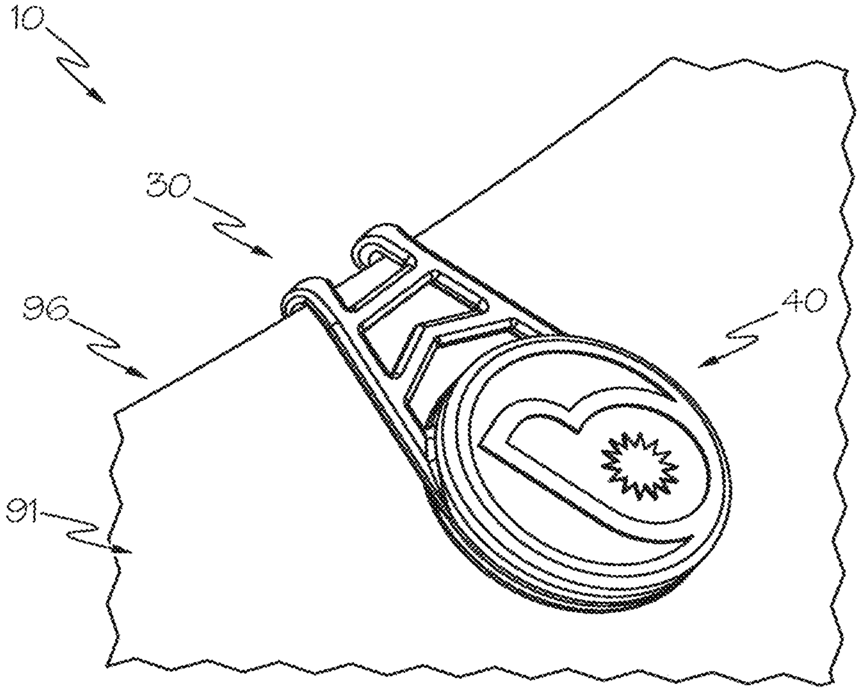
FIG. 5 depicts an illustrative embodiment of the illumination device coupled to an edge of a canvas chair, according to one or more embodiments shown and described herein.

FIGS. 2 and 3 depict fold views of the illumination device 10 where the body 30 is folded such that the first portion 20 and the second portion 40 are axially aligned and magnetically coupled together. FIGS. 4 and 5 further depict illustrative installations of the illumination device with the edge 95 of a tarp 90 (or tent) as depicted in FIG. 4 and the edge 96 of a canvas chair 91 as depicted in FIG. 5. As depicted, the body 30 may fold around the edge 95, 96 of the object (e.g., a tarp 90, tent, chair 91, or the like) such that the first portion 20 and the second portion 40 align with each other and the material of the object is positioned between the first portion 20 and the second portion 40. Magnets disposed within one or both of the first portion 20 and the second portion 40 enable magnetic attraction between the first portion 20 and the second portion 40 thereby clamping onto the material of the object. The one or more magnets include a neodymium magnet. It should be understood that magnets are only needed in one portion 20, 40 and that the other portion 20, 40 may include magnetically attractive material. However, in embodiments, described herein, both the first portion 20 and the second portion 40 include one or more magnets.

Figure 6:
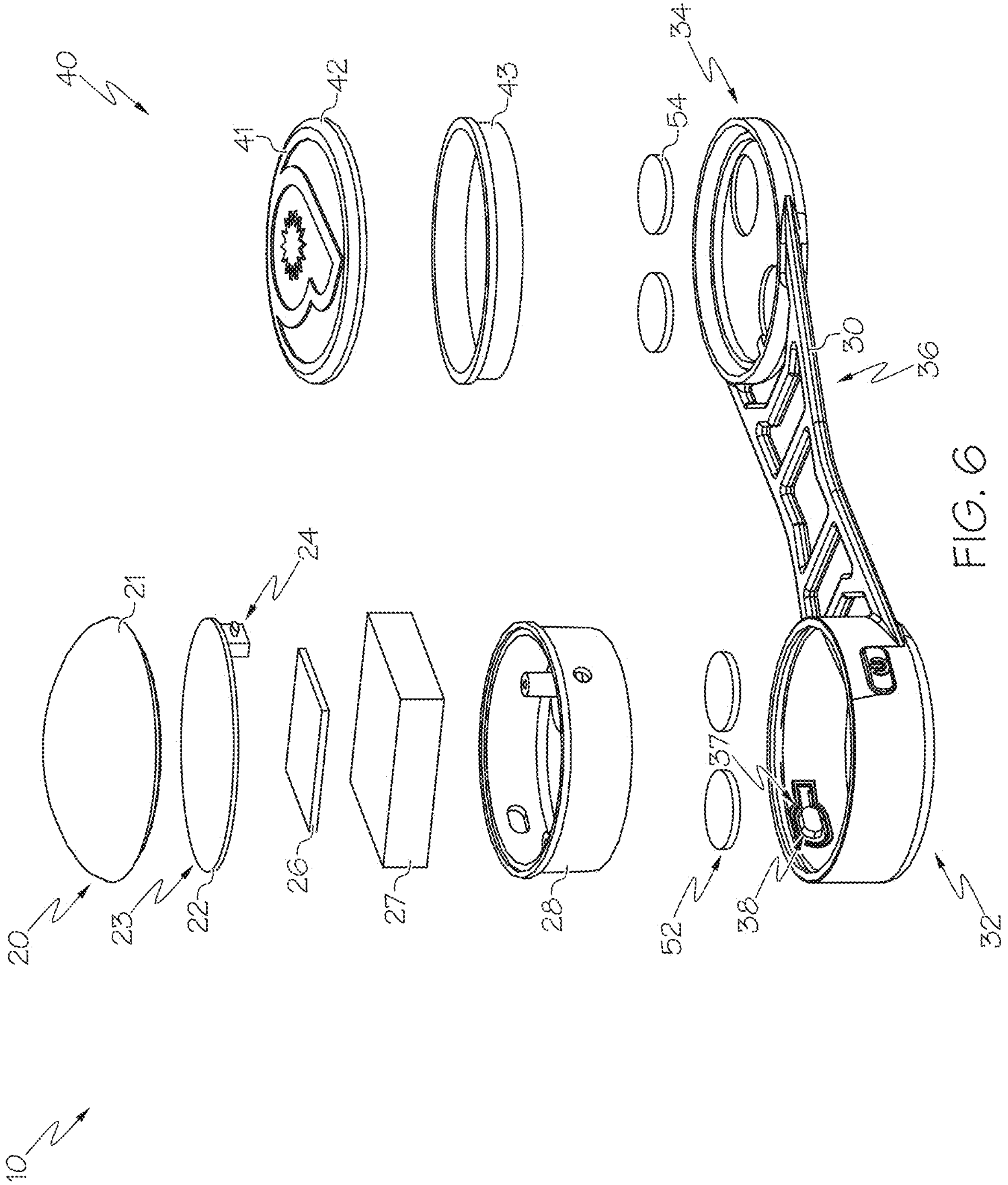
FIG. 6 depicts an exploded component view of an embodiment of the illumination device, according to one or more embodiments shown and described herein.
Figure 7:
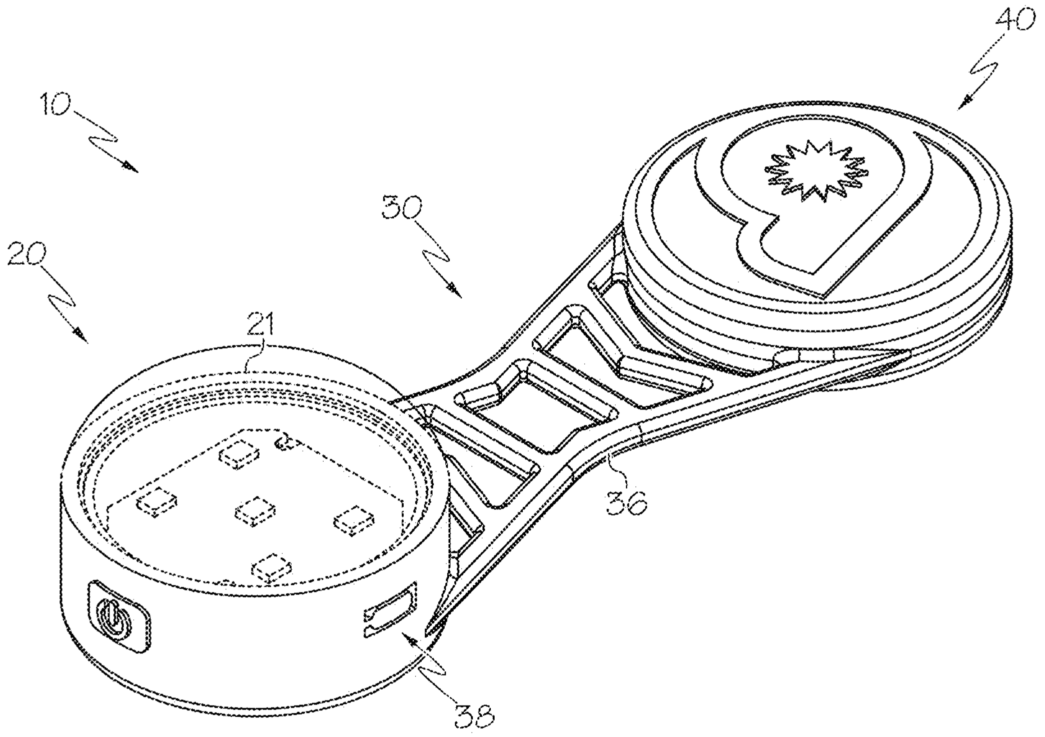
FIG. 7 depicts an illustrative design view of the illumination device, according to one or more embodiments shown and described herein.

Turning to FIG. 6, an exploded component assembly view of the illumination device 10 is depicted. The assembly depicted in FIG. 6 is merely an example. The first portion 20 of the illumination device 10 includes a lens 21, a circuit board assembly 22 having one or more illumination sources 23, a switch 24, a charging port (25, FIG. 11), a foam spacer 26, a power source 27, and an internal body 28. The lens 21 is positioned such that light from the one or more illumination sources 23 passes there through. The lens 21 may be transparent, semi-transparent, or has a diffuse texture such that light emitted by the one or more illumination sources 23 appears in a generally even (diffuse) fashion. The internal body 28 provides a rigid or semi rigid structure for housing and/or coupling the other components of the first portion 20 thereto. The internal body 28 may have a cylindrical shape that is enclosed or partially enclosed on one end and forming a cavity therein to receive and house the power source 27, the foam spacer 26, and the circuit board assembly 22. The circuit board assembly 22 be mounted to the open end of the internal body 28 enclosing the power source 27 and the foam spacer 26 therein. The foam spacer 26 operates as a mechanical and electrical separator between the circuit board assembly 22 and the power source 27.

Figure 11:
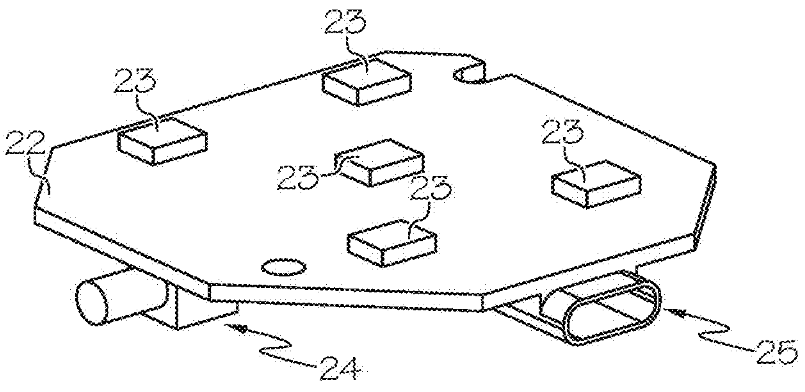
FIG. 11 depicts an illustrative view of a circuit board assembly for an illumination device, according to one or more embodiments shown and described herein.
Figure 12:
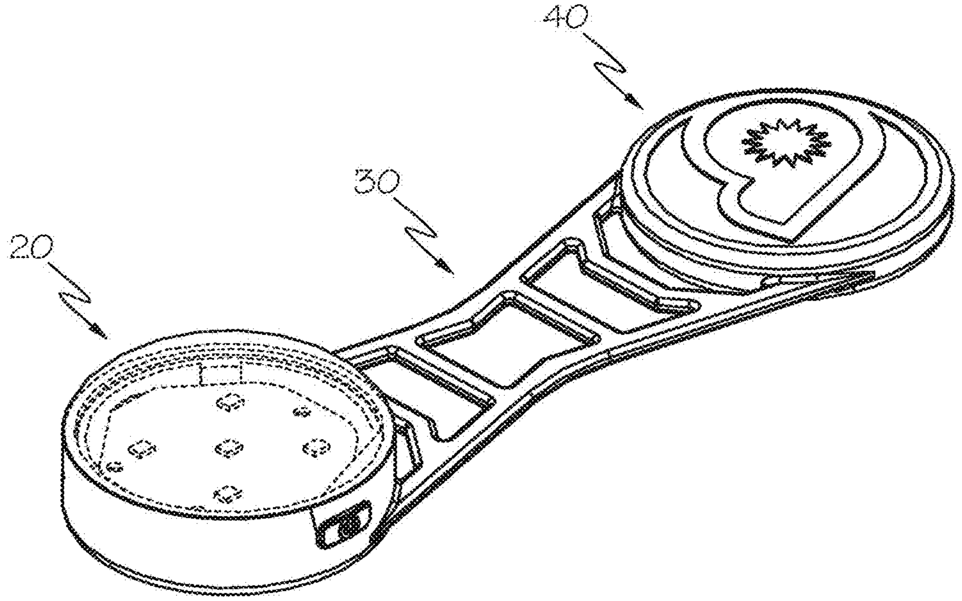
FIG. 12 depicts an illustrative design view of a second illumination device, according to one or more embodiments shown and described herein.
Figure 13:
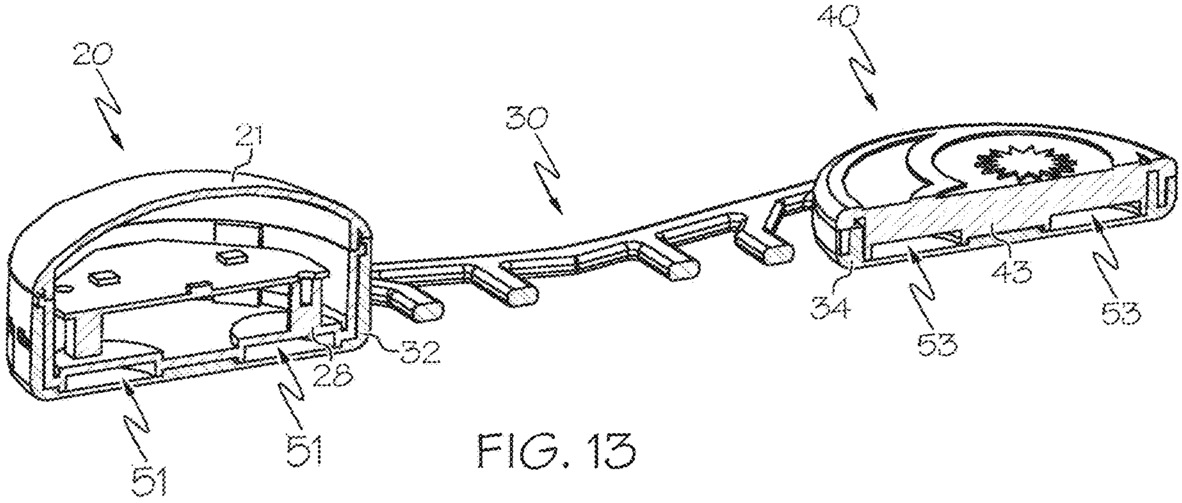
FIG. 13 depicts an illustrative longitudinal cross-sectional view of the second illumination device, according to one or more embodiments shown and described herein.

The circuit board assembly 22, which is depicted in further detail in FIG. 11, includes a print circuit board electrically and mechanically coupling one or more illumination sources 23, the switch 24 and the charging port (25, FIG. 11) together. The circuit board assembly 22 includes a plurality of electrical components configured to provide power from the power source 27 to the one or more illumination sources 23 in response to activation of the switch 24.

A power source 27 such as a battery is electrically coupled to the circuit board assembly 22. The power source 27 may be a primary battery or a secondary battery such as a rechargeable battery. The secondary battery may be a lithium polymer or the like. The battery may have a capacity capable of generating 12 hours of light at high brightness and/or 46 hours of light when operating in a flashing mode on a single charge. The circuit board assembly 22 includes a charging port 25. The charging port 25 is electrically and mechanically coupled to the circuit board assembly 22. The charging port 25 may be a mini-USB, a micro-USB, or a USB-C type port. The charging port 25 enables the power source 27 to be charged from an external power source. The charging port 25 is accessible through an opening in the internal body 28. A charging port cover 38 of the body 30 may be fitted to selectively close the opening in the internal body 28. The charging port cover 38 may be made of a pliable material such that an interference fit may be achieved with the internal body 28. A portion of the charging port cover 38 may be coupled to the body 30 such that when the charging port cover 38 is removed from the opening in the internal body 28, the charging port cover 38 remains attached to the body 30.

The switch 24 may be a push button whereby sequential operation of the push button causes the one or more illumination sources 23 to output light at a corresponding power level, cycle through one or more colors, flash or strobe, or deactivate. For example, a first press of the button causes the one or more illumination sources 23 to provide light at a first brightness level (e.g., 25% power level). A second press of the button causes the one or more illumination sources 23 to provide light at a second brightness level (e.g., 50% power level). A third press of the button causes the one or more illumination sources 23 to provide light at a third brightness level (e.g., 100% power level). A fourth press of the button causes the one or more illumination sources 23 to deactivate (e.g., 0% power level). In some embodiments, there may be more or less activation states.

Additionally, in some embodiments, a first press of the button causes the one or more illumination sources 23 to provide light in at a brightness level where the color of the light cycles through a number of different colors. A second press of the button causes the one or more illumination sources 23 to hold illumination at the color that is provided when the button is pressed a second time. A third press of the button may cause the one or more illumination sources 23 to deactivate (e.g., 0% power level). In yet other embodiments, pressing the button a predetermined number of time causes the light to cycle from a steady state to a flashing or strobing state. It should be understood that the order of button presses described here are not limited to only these examples. Other combinations and functions may be implemented. Furthermore, in some embodiments, depressing and holding the button for a predefined period of time causes the illumination device 10 to change operating modes, such as flashing to steady, one to off, a first color to a second color, or the like.

Modes of illumination may include high brightness, medium brightness, low brightness, and/or a flashing mode. The brightness may change my change the power delivered to the light illuminating devices. For example, the light emitting devices may provide 75 lumens, 100 lumens, 150 lumens, 200 lumens, or any level between 75 and 200 lumens. Each brightness mode may be configured to provide a different lumen level. Modes of illumination may also include changing the color of the light emitted. In some embodiments, the one or more illumination sources 23 may be configured cycle or morph from a first color to a second color. As used herein, the term morph refers to a gradual transition from one color or brightness to another. The one or more illumination sources 23 include white LEDs and/or RGBW LEDs.

For example, operating the button (e.g., the switch 24) two times may stop the color rotation of the LEDs on the current color. Operating the button three times may power off the one or more illumination sources 23. In other embodiments, operating the button an additional time while the light source is powered on may set the one or more illumination sources 23 to low brightness. Operating the button a second additional time sets the one or more illumination sources 23 to high brightness. Operating the button a third additional time sets the one or more illumination sources 23 to flash at high brightness. Operating the button a fourth additional time may power off the one or more illumination sources 23. Operating the buttons in rapid succession can cause one of a number various modes of illumination. The aforementioned operation sequence is merely an example.

In another embodiment, operating the button one time powers on the one or more illumination sources 23 at low brightness. Operating the button two times sets the one or more illumination sources 23 to high brightness. Operating the button three times sets the one or more illumination sources 23 to flash at high brightness. Operating the button four times powers off the one or more illumination sources 23.

Figure 8:
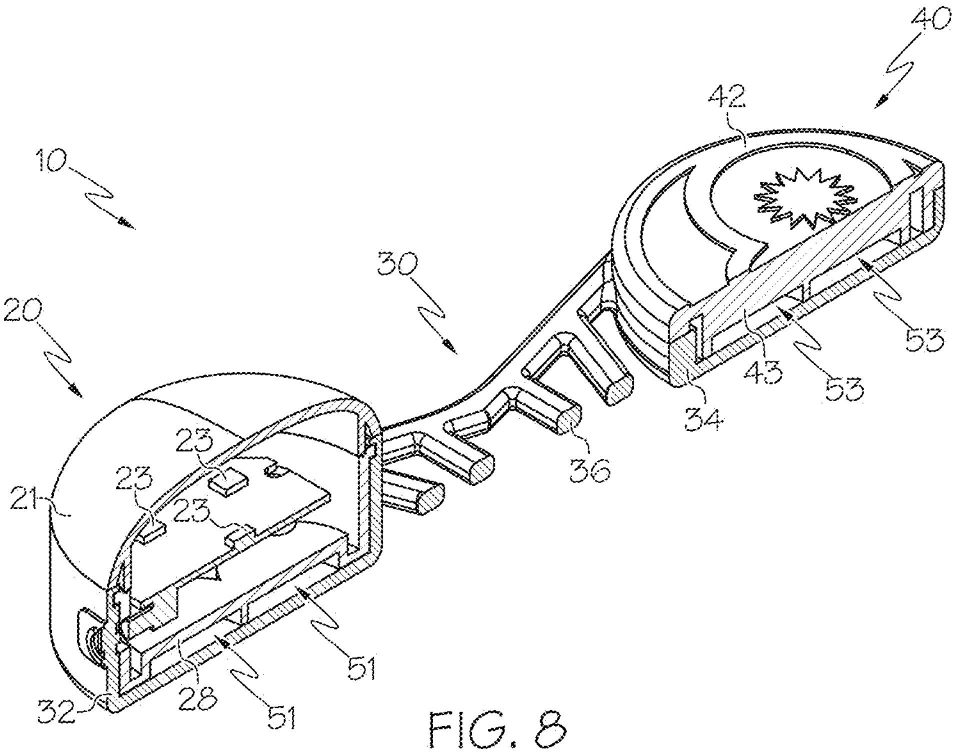
FIG. 8 depicts an illustrative longitudinal cross-sectional view of the illumination device, according to one or more embodiments shown and described herein.
Figure 9:
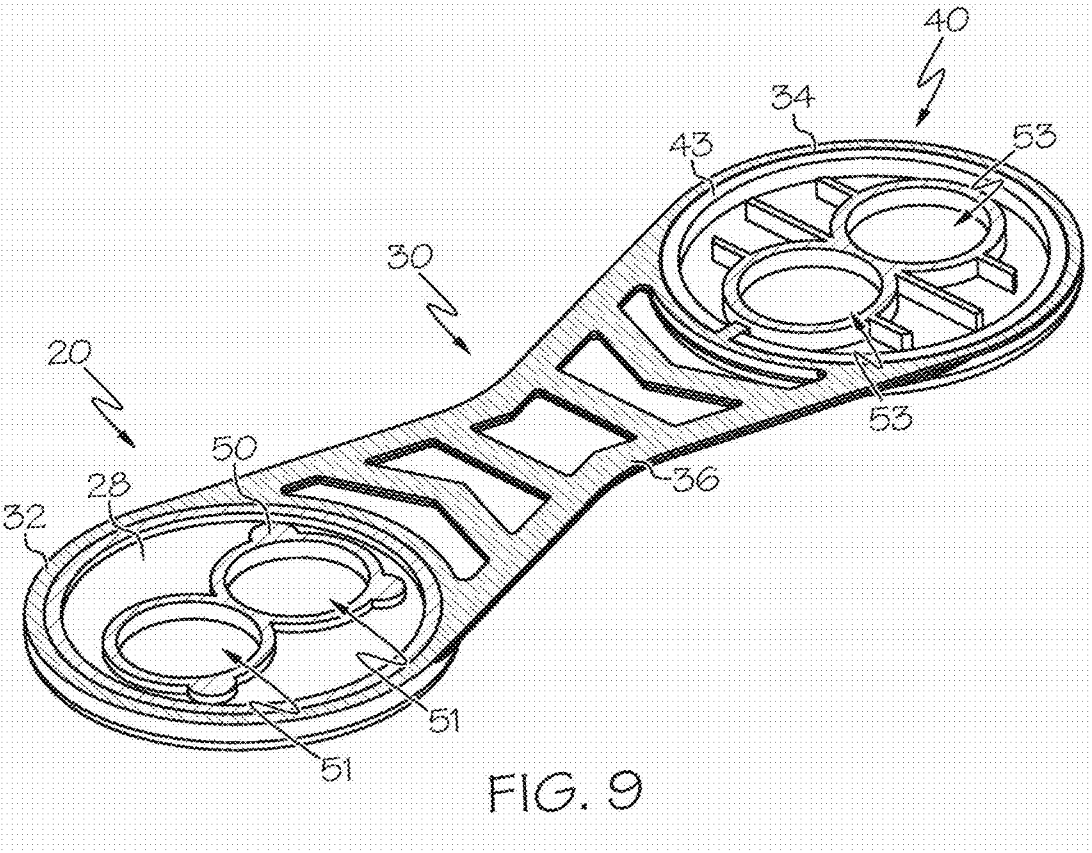
FIG. 9 depicts an illustrative horizontal cross-sectional view of the illumination device, according to one or more embodiments shown and described herein.
Figure 10:
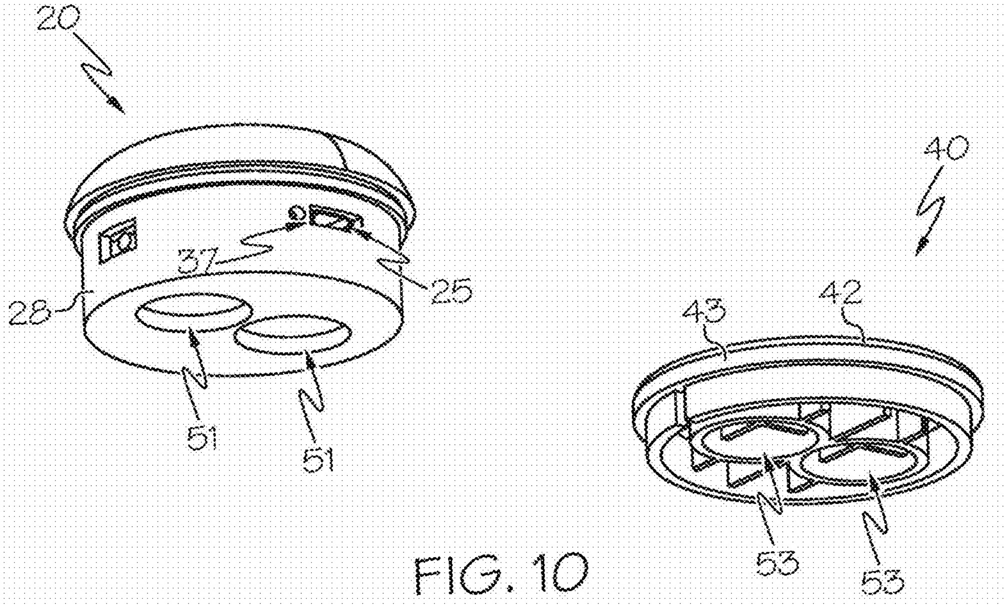
FIG. 10 depicts an illustrative view of the illumination device without the body, according to one or more embodiments shown and described herein.

Still referring to FIG. 6, the internal body 28 includes one or more cavities (51, FIG. 8) for receiving and housing one or more magnets 52. The internal body 28 may include cavities (51, FIG. 8) formed therein that correspond to the size and shape of the one or more magnets 52. The one or more magnets 52 are permanent magnets. The one or more magnets 52 may be attached to the internal body 28 with adhesive or magnetically coupled to a metal insert (50, FIG. 9) within fastened in the internal body 28.

The body 30 of the illumination device 10 may be a flexible material such as silicone or a rubber like material. The body 30 is formed as an elongated member having a first end 32 for receiving the first portion 20, a connecting member 36, and a second end 34 for receiving the second portion 40. The first end 32, the connecting member 36, and the second end 34 may be integrally formed as one piece. The connecting member 36 enables the first end and second end to fold onto each other. Additionally, the first end 32 includes an opening 37 that corresponds to the charging port 25 and the opening in the internal body 28 such that a charging connector may couple with the charging port 25. In some embodiments, the charging port cover 38 may be formed with the body 30 or as a secondary piece that fastens to the body 30. Moreover, the first end 32 receives the internal body 28 and may further secure the magnets in cavities (51, FIG. 8) of the internal body 28.

The second end 34 of the body 30 includes a portion that receives a back body 43 of the second portion 40. The back body 43, similar to the internal body 28 may be rigid and includes one or more cavities (53, FIG. 8) for one or more magnets 54. Additionally, the back body 43 may be coupled to a cap 42 which optionally includes a logo 41. The internal body 28, the back body 43, and the cap 42 may be made of ABS plastic or another rigid material.

Figure 14:
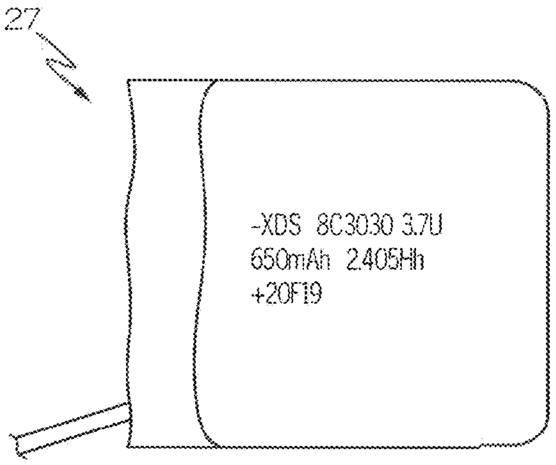
FIG. 14 depicts an illustrative example of a battery for the second illumination device, according to one or more embodiments shown and described herein.

FIGS. 7-13 provide various illustrative schematic views of embodiments of the illumination device 10. Each of these views provide further illustrations and views of the components previously described. It should be understood that various design modification may be implemented. FIG. 14 depicts an illustrative power source 27 for the illumination device 10. For example, the power source 27 may be a battery such as a li-ion battery. The battery may have a nominal voltage of 3.7 volts and 650 mAh capacity. The capacity of the battery may vary based on the runtime requirements of the illumination device 10.

Implementation examples are described in the following numbered clauses:

An illumination device having an elongated flexible body having a first end connected to a second end via a flexible connecting body; and an illumination portion coupled to the first end and a coupling portion coupled to the second end, wherein the illumination portion includes one or more illuminating sources and a first magnetic component housed within the illumination portion, the coupling portion includes a second magnetic component housed within the coupling portion, and the flexible connecting body is capable of folding such that the illumination portion and the coupling portion axially align and the first magnetic component magnetically couples to the second magnetic component.

The illumination device of any preceding clause, wherein the flexible connecting body comprises silicone.

The illumination device of any preceding clause, wherein the flexible connecting body is configured to fold over an edge of at least one of a canvas chair or a tent tarp.

The illumination device of any preceding clause, wherein the first magnetic component comprises at least two magnets and the second magnetic component comprises at least two magnets.

The illumination device of any preceding clause, wherein the first magnetic component and the second magnetic component comprises a neodymium magnet.

The illumination device of any preceding clause, wherein at least one of the first magnetic component or the second magnetic component includes one or more magnets and the other one of the least one of the first magnetic component or the second magnetic component includes a magnetic material.

The illumination device of any preceding clause, wherein the illumination portion comprises a lens, a circuit board assembly having one or more illumination sources and a power source electrically coupled to the circuit board assembly, the circuit board assembly configured to cause the one or more illumination sources provide light through the lens.

The illumination device of any preceding clause, wherein the power source is a rechargeable battery.

The illumination device of any preceding clause, wherein the circuit board assembly further comprises a charging port configured to receive power from an external power source to charge the power source.

The illumination device of any preceding clause, wherein the circuit board assembly further comprises a switch configured to operate the one or more illumination sources.

The illumination device of any preceding clause, wherein operation of the switch causes the one or more illumination sources to operate in one or more of a plurality of modes including: activating the one or more illumination sources, causing the one or more illumination sources to cycle through a plurality of colors, causing the one or more illumination sources to hold the cycling through the plurality of colors on a selected color, or deactivating the one or more illumination sources.

The illumination device of any preceding clause, wherein operation of the switch causes the one or more illumination sources to operate in one or more of a plurality of modes comprising: activating the one or more illumination sources, activating the one or more illumination sources to generate light at one or more different brightness levels through one or more depressions of the switch, causing the one or more illumination sources to flash, or deactivating the one or more illumination sources.

An illumination device having an illumination portion and a coupling portion, wherein the illumination portion includes one or more illuminating sources and a first magnetic component housed within the illumination portion, the coupling portion includes a second magnetic component housed within the coupling portion, and the illumination portion and the coupling portion are capable of attached to each other through a material when axially align such that the first magnetic component magnetically couples to the second magnetic component.

The illumination device of any preceding clause, wherein the illumination portion magnetically couples to the coupling portion through at least one of a canvas chair or a tent tarp.

The illumination device of any preceding clause, wherein the first magnetic component comprises at least two magnets and the second magnetic component comprises at least two magnets.

The illumination device of any preceding clause, wherein the first magnetic component and the second magnetic component comprises a neodymium magnet.

The illumination device of any preceding clause, wherein at least one of the first magnetic component or the second magnetic component includes one or more magnets and the other one of the least one of the first magnetic component or the second magnetic component includes a magnetic material.

The illumination device of any preceding clause, wherein the illumination portion comprises a lens, a circuit board assembly having one or more illumination sources and a power source electrically coupled to the circuit board assembly, the circuit board assembly configured to cause the one or more illumination sources provide light through the lens.

The illumination device of any preceding clause, wherein the circuit board assembly further comprises a charging port configured to receive power from an external power source to charge the power source.

The illumination device of any preceding clause, wherein the circuit board assembly further comprises a switch configured to operate the one or more illumination sources.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the disclosure should be construed to include everything within the scope of the appended claims and their equivalents.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments, but should be defined only in accordance with the following claims and their equivalents.

What is claimed is:

1. An illumination device comprising:

an illumination portion including one or more illumination sources, and a coupling portion flexibly connected to the illumination portion;

wherein the illumination portion and the coupling portion are capable of coupling together through magnetic force provided by at least one magnet positioned within the illumination portion or the coupling portion, and wherein the illumination device is selectively positionable in a planar orientation in which the illumination portion and coupling portion form an included angle of 180 degrees.

2. The illumination device of claim 1, wherein the at least one magnet is a neodymium magnet.

3. The illumination device of claim 1, wherein the illuminated portion and the coupling portion are flexibly connected such that the illumination portion and the coupling portion are capable of axially aligning.

4. The illumination device of claim 1, further comprising a flexible body connecting the illumination portion to the coupling portion, wherein the illumination portion and the coupling portion are integrally formed at a first end and a second end, respectively, of the flexible body.

5. The illumination device of claim 1, wherein the illumination portion further comprises a lens, a circuit board assembly, a power source electrically coupled to the circuit board assembly, and wherein the circuit board assembly is configured to cause the one or more illumination sources to provide light through the lens.

6. The illumination device of claim 5, wherein the power source is a rechargeable battery.

7. The illumination device of claim 5, wherein the circuit board assembly further comprises a charging port configured to receive power from an external power source to charge the power source.

8. The illumination device of claim 5, wherein the circuit board assembly further comprises a switch configured to operate the one or more illumination sources.

9. The illumination device of claim 8, wherein operation of the switch causes the one or more illumination sources to operate in one or more of a plurality of modes comprising:

activating the one or more illumination sources, causing the one or more illumination sources to cycle through a plurality of colors, causing the one or more illumination sources to hold the cycling through the plurality of colors on a selected color, or deactivating the one or more illumination sources.

10. The illumination device of claim 8, wherein operation of the switch causes the one or more illumination sources to operate in one or more of a plurality of modes comprising:

activating the one or more illumination sources, activating the one or more illumination sources to generate light at one or more different brightness levels through one or more depressions of the switch, causing the one or more illumination sources to flash, or deactivating the one or more illumination sources.

11. An illumination device comprising:

an illumination portion having:

a circuit board assembly, a power source electrically coupled to the circuit board assembly, one or more illuminating sources electrically coupled to the circuit board assembly, a lens, wherein the circuit board assembly is configured to cause the one or more illuminating sources to provide light through the lens; and a coupling portion capable of coupling with the illumination portion through magnetic force provided by at least one magnet positioned within the illumination portion or the coupling portion, wherein the illumination device is selectively positionable in a planar orientation in which the illumination portion and coupling portion form an included angle of 180 degrees.

12. The illumination device of claim 11, wherein the illumination portion couples to the coupling portion through at least one of a canvas chair or a tent tarp.

13. The illumination device of claim 11, wherein the at least one magnet is a neodymium magnet.

14. The illumination device of claim 11, wherein each of the illumination portion and the coupling portion include at least one magnet of the at least one magnet.

15. The illumination device of claim 14, wherein the illumination portion comprises at least two neodymium magnets and the coupling portion comprises at least two neodymium magnets.

16. The illumination device of claim 11, wherein the power source is a rechargeable battery.

17. The illumination device of claim 11, wherein the circuit board assembly further comprises a charging port configured to receive power from an external power source to charge the power source.

18. The illumination device of claim 11 wherein the circuit board assembly further comprises a switch configured to operate the one or more illumination sources.

19. An illumination device comprising:

an illumination portion having a housing and at least one first magnetic component positioned within the housing, and a coupling portion having at least one second magnetic component such that the coupling portion is capable of coupling to the illumination portion through magnetic force;

wherein the illumination portion and the coupling portion are capable of axially aligning and coupling together with an object disposed therebetween, and wherein the illumination device is selectively positionable in a planar orientation in which the illumination portion and coupling portion form an included angle of 180 degrees.

20. An illumination device comprising:

a body having a first end and a second end, wherein the first end is an illuminated end and wherein the second end is a coupling end, a first portion coupled to the illuminated end, the first portion having a housing, one or more illumination devices, and a first magnetic component, a second portion coupled to the coupling end, the second portion having a back body, cap, and a second magnetic component, wherein either or both of the first magnetic component and the second magnetic component is a magnet, and wherein the body is configurable such that the first magnetic component and the second magnetic component sit in a common plane.

* * * * *